(12) United States Patent
Scholz et al.

(10) Patent No.: US 8,944,185 B2
(45) Date of Patent: Feb. 3, 2015

(54) SYSTEMS AND METHODS TO REDUCE OSCILLATIONS IN MAGNETIC COUPLINGS

(75) Inventors: Eckard Scholz, Eldingen (DE); Helge Brand, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 595 days.

(21) Appl. No.: 13/172,156

(22) Filed: Jun. 29, 2011

(65) Prior Publication Data

US 2013/0000991 A1    Jan. 3, 2013

(51) Int. Cl.
| | |
|---|---|
| *E21B 4/02* | (2006.01) |
| *E21B 17/02* | (2006.01) |
| *H02K 7/02* | (2006.01) |
| *H02K 49/10* | (2006.01) |
| *F16F 15/03* | (2006.01) |

(52) U.S. Cl.
CPC ............ *H02K 49/106* (2013.01); *E21B 17/028* (2013.01); *Y02E 60/16* (2013.01); *H02K 7/02* (2013.01); *E21B 4/02* (2013.01); *F16F 15/03* (2013.01)
USPC ............... 175/107; 175/92; 166/66.5; 464/29

(58) Field of Classification Search
CPC ......... E21B 4/02; E21B 4/00; E21B 41/0085; E21B 47/122; H02K 49/106
USPC ......................... 175/92, 107; 166/66.5; 464/29
See application file for complete search history.

(56) References Cited

U.S. PATENT DOCUMENTS

| | | | | |
|---|---|---|---|---|
| 4,732,225 | A | * | 3/1988 | Jurgens et al. ................... 175/92 |
| 5,265,682 | A | * | 11/1993 | Russell et al. ................... 175/45 |
| 5,343,381 | A | | 8/1994 | Bolduc et al. |
| 6,675,877 | B2 | | 1/2004 | Sandu et al. |
| 6,863,124 | B2 | * | 3/2005 | Araux et al. ................. 166/66.4 |
| 7,481,283 | B2 | * | 1/2009 | McDonald et al. ........... 175/106 |
| 7,549,467 | B2 | * | 6/2009 | McDonald et al. .......... 166/66.4 |
| 7,673,683 | B2 | * | 3/2010 | Gissler ....................... 166/255.1 |
| 7,779,912 | B2 | * | 8/2010 | Gissler ....................... 166/255.1 |
| 7,828,066 | B2 | * | 11/2010 | Jahn .............................. 166/383 |
| 2008/0196890 | A1 | * | 8/2008 | Fout et al. ................. 166/250.15 |

FOREIGN PATENT DOCUMENTS

JP    09074777    3/1997

OTHER PUBLICATIONS

Notification of Transmittal of the International Search Report and the Written Opinion of the International Searching Authority, or the Declaration; PCT/US2012/043324; Dec. 11, 2012.

* cited by examiner

*Primary Examiner* — Nicole Coy
(74) *Attorney, Agent, or Firm* — Cantor Colburn LLP (57) ABSTRACT

A drilling system includes a magnetic coupling and an oscillation absorber. The magnetic coupling has a rotor that rotates about an axis of rotation. The oscillation absorber is in operable communication with the magnetic coupling and includes an outer layer coupled to a separator layer of the magnetic coupling to form an enclosed area. An absorber shaft of the oscillation absorber is at least partially within the enclosed area and is coupled to the rotor. The absorber further includes an outer mover arranged such that rotation of the absorber shaft causes the outer mover to rotate due to interaction of inner absorber shaft magnets and outer mover magnets.

8 Claims, 7 Drawing Sheets

SYSTEMS AND METHODS TO REDUCE OSCILLATIONS IN MAGNETIC COUPLINGS

BACKGROUND

1. Field of the Invention

The present invention generally relates to magnetic couplings and, in particular, to reducing rotational variations due to self oscillations.

2. Description of the Related Art

Magnetic couplings can be used to transmit rotary motion from one rotatable element to another. A typical magnetic coupling includes two movers. The first mover surrounds a portion of the second mover. The first and second movers both include magnets in the region where they overlap. As is known in the art, the magnets are arranged such that rotation of one of the movers causes the other mover to rotate due to attraction and repulsive forces between the magnets.

One advantage of magnetic couplings is that they can transmit rotary motion from one mover to another without the two movers mechanically contacting each other. This can be useful in situations where a shaft or other mover located in a sealed environment needs to be rotated. An example of such a case can occur in context of drilling a borehole into the earth. In such a case, a bottom hole assembly (BHA) of drill string may require power. The power can be generated by an alternator in the BHA. Given the harsh conditions that exist in a borehole, it is desirable that the alternator be protected from drilling fluid and enclosed in a sealed environment. To this end, a magnetic coupling can be attached to the shaft of the alternator. The magnetic coupling includes an inner rotor having magnets surrounded by an outer housing that also includes magnets. The outer housing can be coupled to the alternator such that the combination forms a sealed environment. The outer housing is fixedly coupled to a turbine. Drilling mud is pumped through the turbine causing it, the outer housing of the alternator to rotate. The magnets in the outer housing and the magnets on the rotor interact such that the rotation of the outer housing causes the rotor to rotate. The rotation can be used to generate electricity for the BHA. As is known in the art, rather than being coupled to an alternator, the magnetic coupling can be attached to any shaft driven devices such as, for example, a pump.

BRIEF SUMMARY

Disclosed is drilling system that includes a magnetic coupling and an oscillation absorber. The magnetic coupling includes a rotor having a plurality of inner magnets disposed thereon in circular arrangement in an inner magnet region, a separator layer surrounding the inner magnet region, and an outer housing surrounding the inner magnet region and separated from the inner magnet region by the separator layer and including outer magnets and arranged such that rotation of the outer housing causes the rotor to rotate about an axis of rotation. The oscillation absorber is in operable communication with the magnetic coupling and includes an outer layer coupled to the separator layer to form an enclosed area, an absorber shaft at least partially within the enclosed area that is coupled to the rotor and that includes inner absorber shaft magnets coupled to it, and an outer mover having outer mover magnets disposed therein and arranged such that rotation of the absorber shaft causes the outer mover to rotate due to interaction of the inner absorber shaft magnets and the outer mover magnets.

Also disclosed is a drilling system that includes a turbine and turbine a magnetic coupling coupled to the turbine. The magnetic coupling includes a rotor having a plurality of inner magnets disposed thereon in circular arrangement in an inner magnet region and separator layer surrounding the inner magnet region. The magnetic coupling also includes an outer housing surrounding the inner magnet region and separated from the inner magnet region by the separator layer and including outer magnets and arranged such that rotation of the outer housing causes the rotor to rotate about an axis of rotation and a first electrically conductive layer disposed on the rotor between the inner magnets and the separator layer.

In addition, a drilling system that includes a turbine and a magnetic coupling coupled to the turbine is disclosed. The magnetic coupling includes a rotor having a plurality of inner magnets disposed thereon in circular arrangement in an inner magnet region, a separator layer surrounding the inner magnet region and an outer housing surrounding the inner magnet region and separated from the inner magnet region by the separator layer and including outer magnets and arranged such that rotation of the outer housing causes the rotor to rotate about an axis of rotation. The drilling system further includes an alternator coupled to the magnetic coupling that provides electricity at an output, a load coupled to the output and an electrical damping circuit coupled in parallel with the load and configured to cancel oscillations in the electricity at a self excitation frequency of the magnetic coupling.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein is by way of exemplification and not limitation with reference to the Figures.

Figure 1:
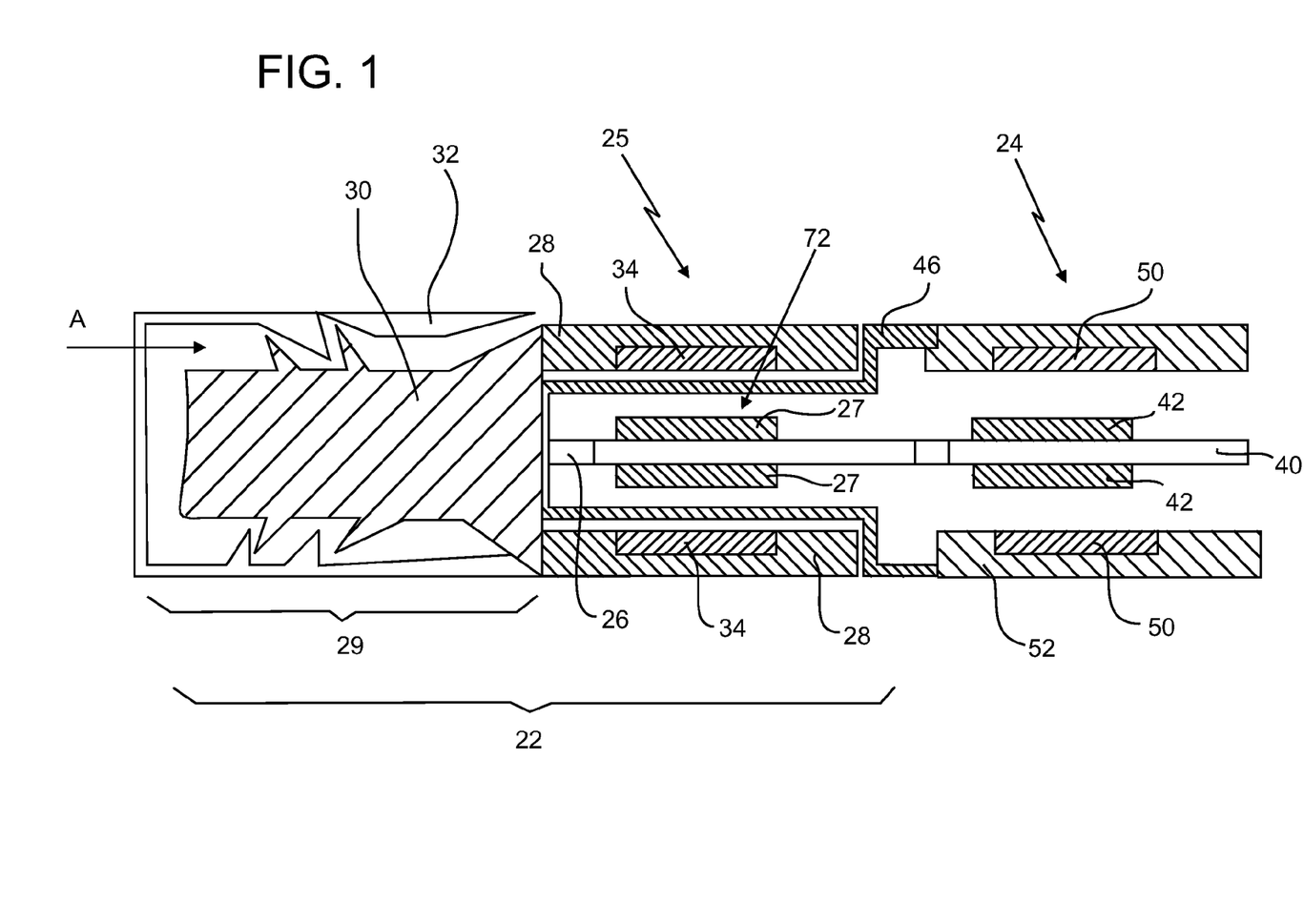
FIG. 1 is a partial cut-away perspective view of a magnetic coupling that provides energy from the motion of drilling mud to an alternator.

FIG. 1 shows an assembly 20 that includes an energy transfer device 22 coupled to an alternator 24. The assembly 20 can be utilized, for example, to create electricity for a bottom hole assembly (BHA) (not shown) of a drill string utilized to drill a borehole into the earth. In general, the energy transfer device 22 converts the flow of a fluid (e.g., drilling mud) into rotational energy. As illustrated in FIG. 1, the rotational energy generated by the energy transfer device 22 is used to drive an alternator 24 to create electrical energy. Of course, the rotational energy could be provided to any type of shaft driven device such as, for example, a pump.

The illustrated energy transfer device 22 includes a turbine 29 operably connected to a magnetic coupling 25. In relation to FIG. 1, assume that a fluid such as drilling mud is being pumped by a mud pump (not shown) in the direction shown by arrow A. The drilling mud is forced between a blade section 30 and a turbine casing 32 of the turbine 29 and causes the blade section 30 to rotate as in known the art.

The magnetic coupling 25 includes an outer housing 28 that surrounds an inner mover illustrated as rotor 26. The outer housing 28 includes outer magnets 34 that surround inner magnets 27 coupled to the rotor 26. The outer housing 28 is rigidly coupled to or integral with the blade section 30 such that it rotates as the blade section 30 rotates. The rotation of the outer housing 28 causes the rotor 26 to rotate due to attractive/repulsive forces between the outer magnets 34 and the inner magnets 27. The rotor 26 is coupled to the alternator rotor 40 of the alternator 24. Magnets 42 coupled to the alternator rotor 40 interact with the stator 50 in a known manner to create electricity.

It is important that fluids (e.g., drilling mud) or solids liberated during drilling do not enter the alternator 24. Accordingly, a separator layer 46 is coupled to an outer casing 52 of the alternator 24 such that debris cannot enter the alternator 24. The separator layer 46, like stator 50, does not rotate and, in combination, the separator layer 46 and the outer casing 52 form a sealed environment for the rotor 26 and the alternator rotor 40. Of course, as is known in the art, the separator layer 46 includes a portion disposed between the inner magnets 27 and the outer magnets 34. In this manner, rotation energy can be passed from a harsh environment (e.g., from outside the outer housing 28) into a sealed environment formed at least in part by the separator layer 46 without physical mechanical contact.

In one embodiment, the separator layer 46 is formed of a material that is neither magnetically or electrically conductive. Examples of suitable materials include, for example, ceramics and advanced materials like (carbon) fiber materials. In another embodiment, the separator layer 46 is formed of an electrically conductive material such as Inconel. Regardless of the particular material used, the separator layer 46 should be formed such that it can withstand hydrostatic pressures that can exist in a down-hole drilling environment. As will be appreciated, the thicker the illustrated separator layer 46 is, the more it leads to a performance degradation (loss of torque) of the magnetic coupling 25 due to increased gap distance between the inner and outer magnets 27, 34. In addition, as the separator layer 46 is increased in thickness, the magnitude of efficiency-reducing eddy currents increases. It shall be understood that the same considerations can apply to any separator layer described herein.

In operation, the relative position of the outer housing 28 and the rotor 26 can vary. In particular, the rotor 26 can alternate between leading and lagging relative to the outer housing 28 due to self-excitation. Measuring the distance in the circumferential direction between two points, one on the outer housing 28 and one on the rotor 26, forms a time varying plot having a frequency referred to as the Eigen, or self oscillation, frequency. In more general terms, the rate of rotation of the rotor 26 increases and decreases in normal operation at a particular frequency. The variations in rotation rate can cause, in some cases, damage to elements connected to the rotor 26. For example, variations in rotor speed can cause the alternator 24 to produce voltage fluctuations and harm electronic components powered by the alternator 24. In extreme cases, the self-oscillation can cause the inner and outer magnets 27, 34 to become decoupled rendering the energy transfer device 22 inoperable.

One approach taken in the prior art to reducing the effects of self-excitation involves the use of complicated electronics to dissipate over-voltages produced by the alternator 24 in a resistor. The complexity of the electronics, the fact that such systems cannot typically account for under-voltages and that such systems cannot usually be utilized for high power (greater than 1400 Watts) renders such an approach less than ideal.

Figure 2:
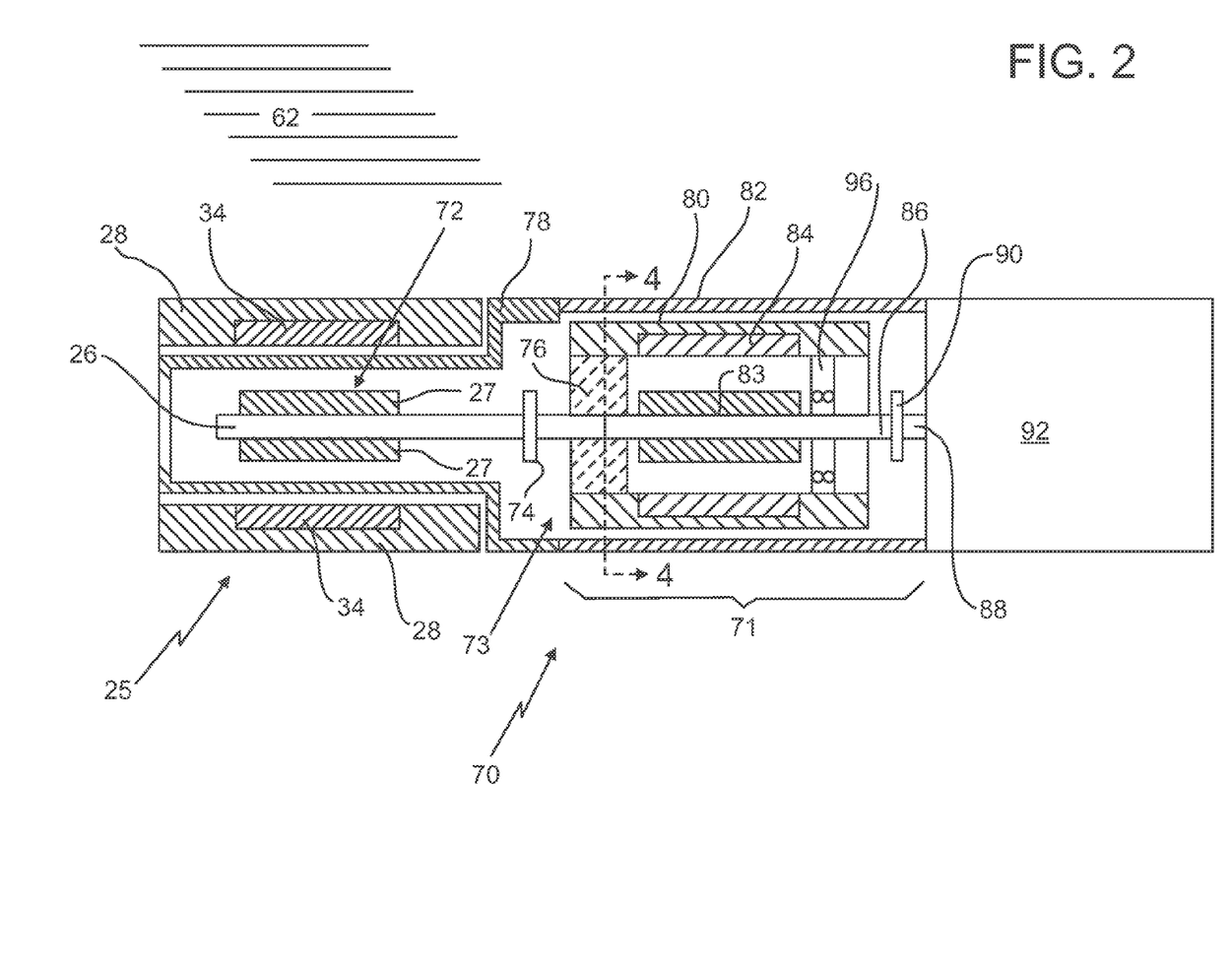
FIG. 2 is a cut-away side view of a drilling system that includes a magnetic coupling coupled to an oscillation absorber.

FIG. 2 is a partial cut-away side view of a drilling system 70 that includes an oscillation absorber 71 according to one embodiment. The drilling system 70 includes a magnetic coupling 25 having a shaft (rotor) 26. As described above, an external force causes rotation of the outer housing 28. The outer housing 28 includes outer magnets 34 disposed within or coupled to it. The outer housing 28 is separated from the rotor 26 by a separator layer 78. Due to the interaction between outer magnets 34 and inner magnets 27 coupled to the rotor 26, the rotor 26 rotates. However, as described above, the relative position between the rotor 26 and the outer housing 28 can vary in a roughly sinusoidal manner about a base rotational rate. That is, in some cases, the rotor 26 rotates faster than the outer housing 28 and sometimes it rotates slower than the outer housing 28.

Figures 3A, 3B:
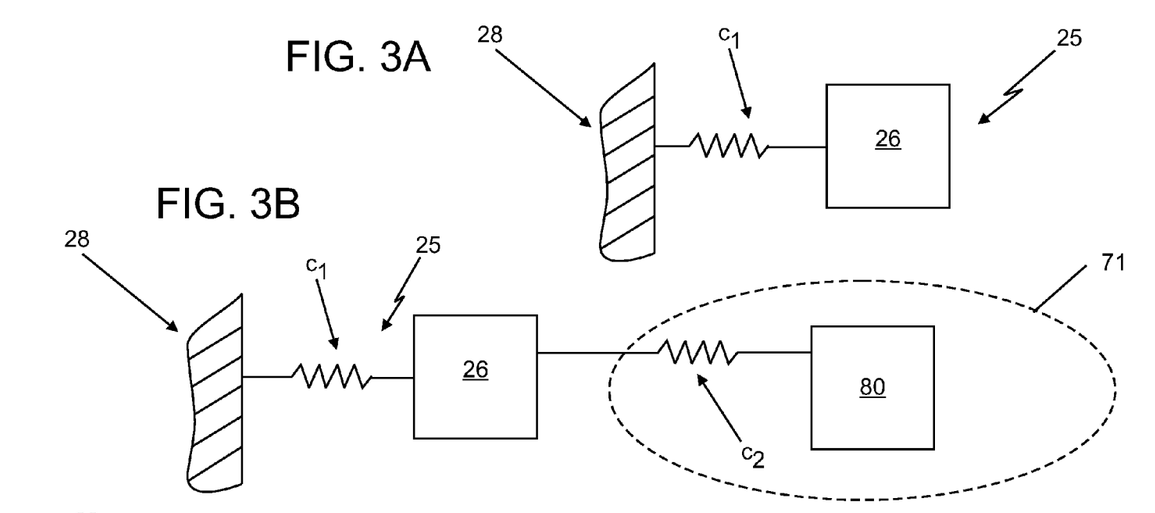
FIGS. 3A-3C illustrate equivalents of the drilling system illustrated in FIG. 2.

Referring now to FIG. 3a, the magnetic coupling 25 can be modeled as a spring-mass system. The outer housing 28 is modeled as the ground, the inner and outer magnets 17, 34 are modeled as spring $c_1$ and the rotor 26 can be thought of as an oscillating mass having an angular frequency $w_0$. In this case, $w_0$ is equivalent to the Eigen frequency described above.

Referring again to FIG. 2, the magnetic coupling 25 is attached to the oscillation absorber 71. In general, the oscillation absorber 71 includes a magnetic spring (i.e., another magnetic coupling) arranged and configured to absorb or otherwise dampen the variations in the rotational rate of the rotor 26. In particular, the oscillation absorber 71 provides a counterweight in the form of outer mover 80 that makes it more difficult for the rotor 26 to vary in speed. As illustrated, the oscillation absorber 71 is between the magnetic coupling 25 and a shaft driven device 92 that utilizes rotational energy provided to input shaft 88 to produce a desired result. Of course, the absorber could be located on an opposite side of the device 92 than the magnetic coupling 25. It shall be understood that the device 92 could be an alternator that produces electricity from the rotation of input shaft 88 or a pump that is driven by input shaft 88 or any other shaft driven device.

The oscillation absorber 71 includes an outer layer 82 that mates either directly or indirectly with the separator layer 78 to form an enclosed area 73 that is sealed from a formation 62 or drilling mud that is external to the drilling system 70. An absorber shaft 86 is coupled to the rotor 26 at coupling 74. Thus, rotor 26 and absorber shaft 86 form a generally unitary shaft that drives the input shaft 88 through coupling 90.

The absorber shaft 86 includes inner absorber shaft magnets 83 coupled to it in the same or similar manner as the inner magnets 27 are coupled to the rotor 26. One or more bearings 96 are disposed between the absorber shaft 86 and the outer mover 80 and hold them in a concentric relationship to one another. Both the absorber shaft 86 and the outer mover 80 are arranged such that they can generally rotate freely within the outer layer 82. The outer mover 80 includes outer absorber magnets 84 coupled to or disposed within it. Absent outer absorber magnets 84, rotation of the absorber shaft 86 would not generally cause outer layer 82 to rotate except due to friction that can exist in the bearing 96. However, the outer absorber magnets 84 can be arranged such that, in combination with inner absorber magnets 83 they form a magnetic spring that behaves in the same manner as a magnetic coupling. That is, in general, as the absorber shaft 86 rotates, so does the outer mover 80.

As described above, rotor 26 can experience rotational rate variations. As the rate increases, the weight of the outer mover 80 will oppose such an increase due to its magnetic coupling to absorber shaft 86. With reference now to FIG. 3B, the system 70 as described to this point can be modeled by adding a representation of the absorber 71 to the representation of the magnetic coupling 25 illustrated in FIG. 3A. In particular, the weight of the outer mover 80 a second mass and the inner and outer absorber magnets 83, 84 are modeled as spring $c_2$. As can be seen easily from FIG. 3A, the outer mover 80 serves to oppose the rotation of the rotor 26. In this example, the weight of the absorber shaft 86 has been omitted but could be included as part of rotor 26 if greater accuracy is desired. The mass of the outer mover 80 can be selected such that it opposes the Eignen frequency of the magnetic coupling 25.

Figure 3C:
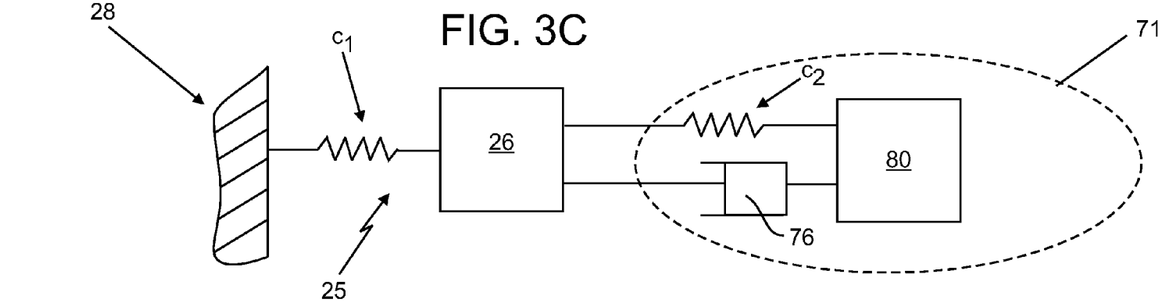
Figure 4:
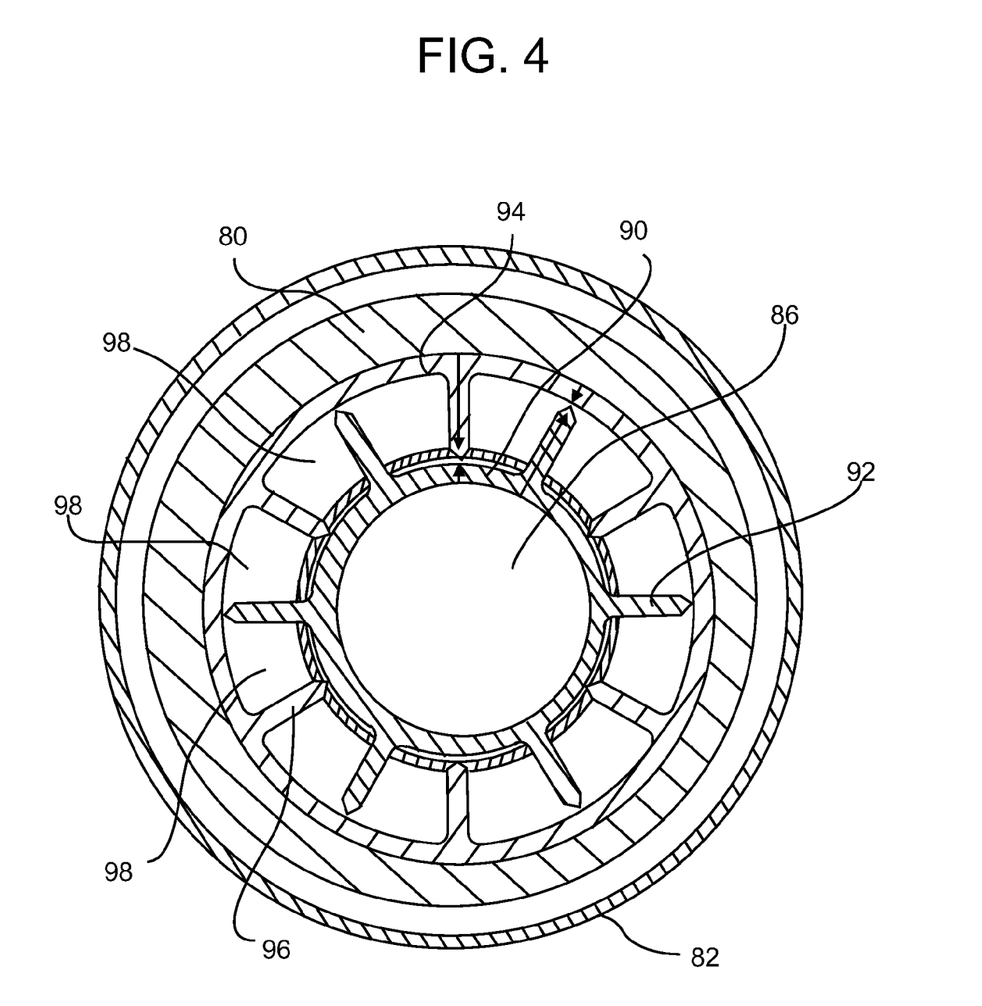
FIG. 4 is a cross-section of the dampener included in FIG. 2.

Optionally, the absorber 71 can also include a dampening device 76. The dampening device 76 can further dampen the rotation rate variations. In one embodiment, and as best illustrated in FIG. 4, which a cross-section taken along line B-B of FIG. 2, the dampening device 76 includes a rotor portion 90 coupled to absorber rotor 86 and that includes a plurality of radially extending rotor fins 92. A stator portion 94 is coupled to the outer mover 80 and includes stator fins 94 that extend radially inward between the rotor fins 92 towards the absorber rotor 86. A fluid such as oil can be disposed in the areas 98 between the stator fins 94 and the rotor fins 92. It shall be understood that the dampening device 76 can dampen the rotational rate variation at a different frequency than the magnetic spring formed by inner and outer dampener magnets 83, 84. FIG. 3C illustrates a model of the system 70 that includes damping device 76. As illustrated in FIG. 3C, the damping device 76 is connected in parallel with the spring $c2$. Of course, is coupled in series with it. It shall be understood that the damping device 76 could be implemented in other manners. For example, the damping device could be implemented as described below and could be used alone or in combination with the spring $c2$.

Figure 5A:
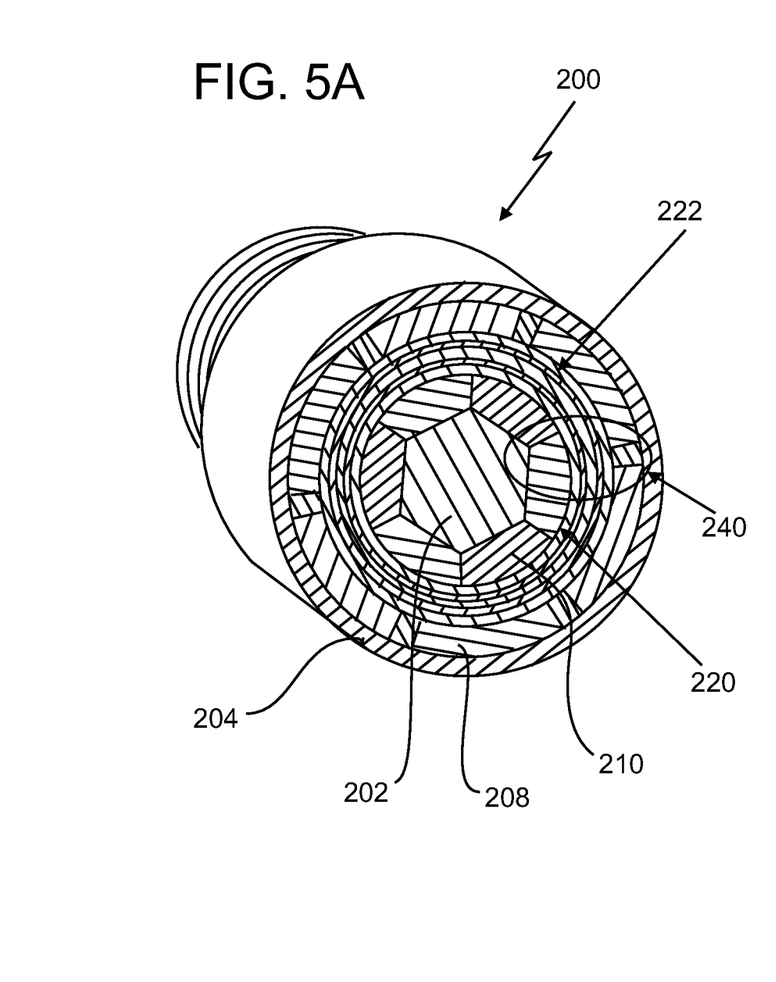
FIG. 5 is a partial cross-sectional view of a magnetic coupling according to an alternative embodiment.
Figure 5B:
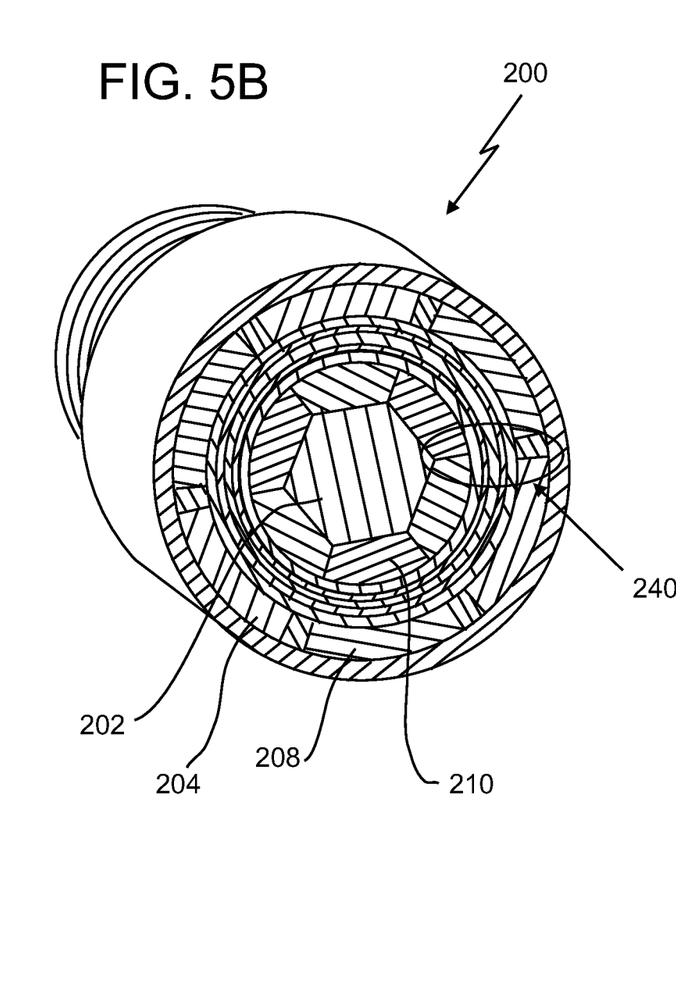
Figure 5C:
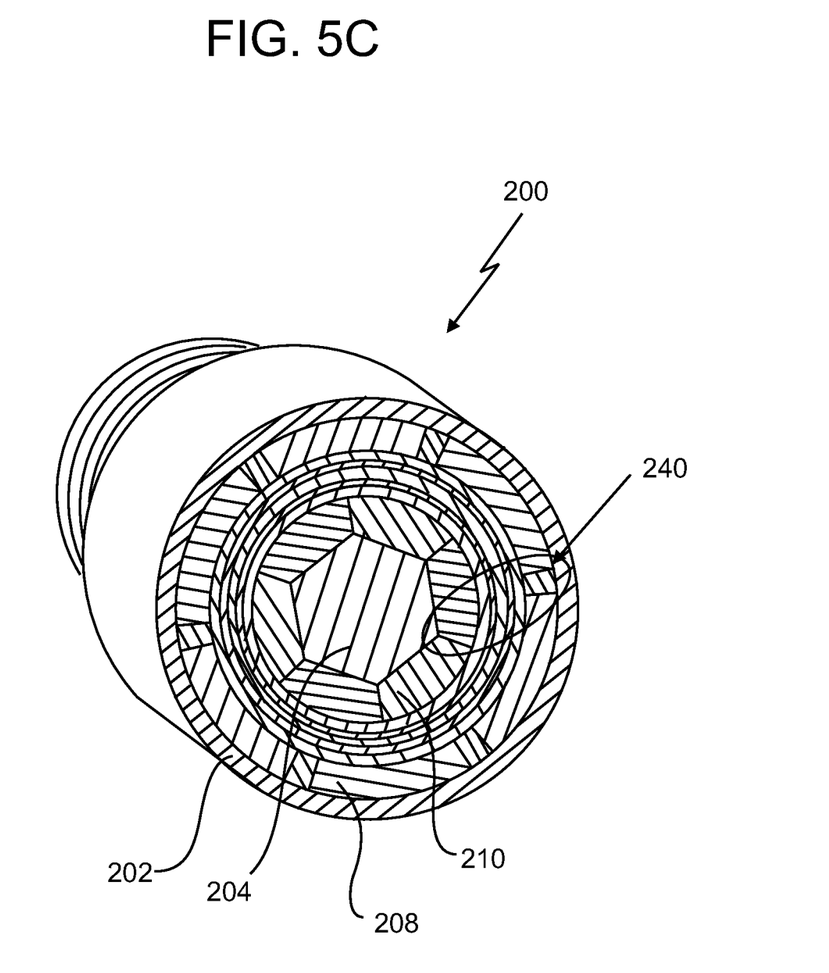

According to another embodiment of the present invention rotational rate variations can be resisted by simply surrounding the inner magnets 27 with a conductor such as copper. In addition, the inside diameter of the outer magnets 34 can also becovered with the same or a similar conductor. FIGS. 5A-5C illustrate cross-sectional views of a magnetic coupling 200 with different relative orientations of the inner and outer magnets 208, 210 according to such an embodiment. In particular, in FIG. 5A the inner magnets 208 lag the outer magnets 210, in FIG. 5B the inner magnets 208 are in phase with the outer magnets 210 and in FIG. 5C the inner magnets lead 208 the outer magnets 210. The magnetic coupling includes a rotor 202 and an outer mover 204. In one embodiment, the outer mover 204 can be coupled to a turbine 29 as illustrated in FIG. 1. The rotor 202 includes inner magnets 208 and the outer mover 204 includes outer magnets 210.

According to one embodiment, a first conductive layer 220 surrounds the inner magnets 208. Similarly, a second conductive layer 222 is disposed on an inner circumference of the outer magnets 210. In one embodiment, the first and second conductive layers 220, 222 are formed of an electrically conductive material such as, for example, copper. In one embodiment, the first conductive layer 220 is disposed between some or all of the inner set of magnets 208 and the separator layer 206. Likewise, in one embodiment, the second conductive layer 222 is disposed between the separator layer 206 and the outer set of magnets 210.

In ideal operation, the rotor 202 and the outer mover 204 move synchronously with one another. However, as discussed above, during normal operation, the relative positions of the rotor 202 and the stator 204 can vary. As indicated in FIGS. 5A-5C, such variation can cause the bending in the flux lines 240 between the inner and outer magnets 208, 210. Such bending causes small movements of the magnetic flux in the first and second conductive layers 220, 222. The movements result in the formation of currents in the first and second conductive layers 220, 222 that serve to oppose movement of the movement of the rotor 202 and the outer mover 204 relative to one another.

Figure 6:
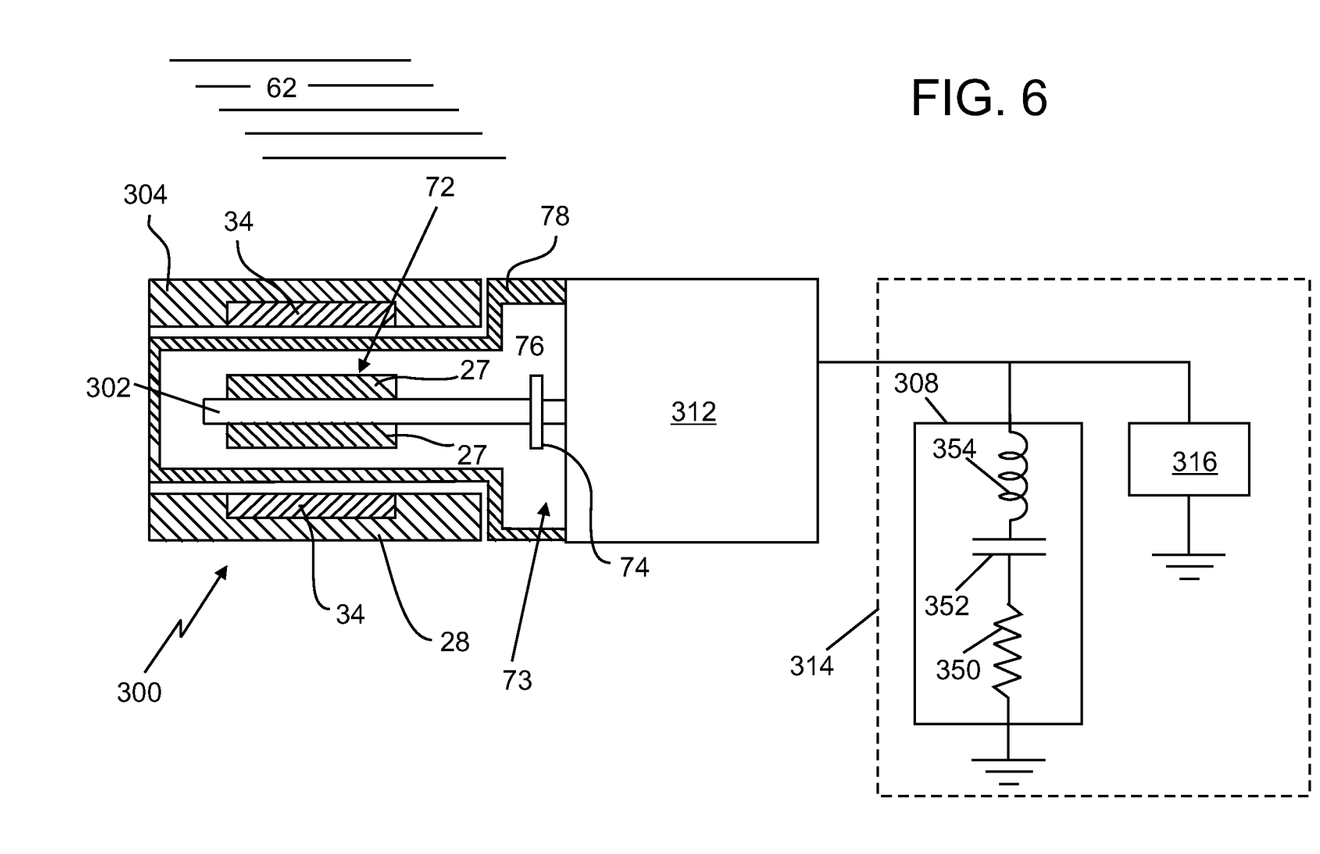
FIG. 6 illustrates an electrical damping circuit connected to the output of an alternator.

According to another embodiment, and referring now to FIG. 6, fluctuations in the output current of an alternator 312 driven by a magnetic coupling 300 caused by relative motion between a rotor 302 and stator 304 can be damped by applying an electrical damping circuit 308 varies the load 314 driven by the alternator 312. As illustrated, the load 314 includes the electrical dampening circuit 308 and a real load 316 such as a pump, sensor or other machine that consumes either AC or DC power.

As discussed above, the magnetic coupling 300 will have an Eigen frequency. After the Eigen frequency is determined, the electrical dampening circuit 308 can be designed to oscillate at the same frequency, but 180 degrees out of phase. In its simplest form, and as illustrated in FIG. 6, the electrical dampening circuit 308 includes a resistor 350, a capacitor 352 and an inductor or coil 354 serially connected and arranged in parallel with the load 314. In some cases, the output of alternator 312 is rectified either in the alternator itself or in an external rectifier (not shown).

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second," and "third" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drilling system comprising:
   a magnetic coupling including:
      a rotor having a plurality of inner magnets disposed thereon in circular arrangement in an inner magnet region;
      a separator layer surrounding the inner magnet region; and
      an outer housing surrounding the inner magnet region and separated from the separator layer and including outer magnets arranged such that rotation of the outer housing causes the rotor to rotate about an axis of rotation; and an oscillation absorber in operable communication with the magnetic coupling, the oscillation absorber including:

an outer layer forming a portion of an enclosed area;

an absorber shaft at least partially within the enclosed area that is coupled to the rotor and that includes inner absorber shaft magnets coupled to it; and an outer mover having outer mover magnets disposed therein and arranged such that rotation of the absorber shaft causes the outer mover to rotate due to interaction of the inner absorber shaft magnets and the outer mover magnets, the outer mover being moveable relative to the outer layer.

2. The drilling system of claim 1, wherein the oscillation absorber further includes:

a bearing that maintains the absorber shaft and the outer mover a fixed distance from one another.

3. The drilling system of claim 1, wherein the outer housing is coupled to one of: a turbine and a mud motor.

4. The drilling system of claim 1, further comprising:

an alternator including an alternator shaft coupled to the absorber rotor.

5. The drilling system of claim 1, further comprising:

a pump including a pump shaft coupled to the absorber rotor.

6. The drilling system of claim 1, wherein the oscillation absorber further includes:

a fluid dampening device coupled to the absorber rotor and the outer mover.

7. The drilling system of claim 6, wherein the fluid dampening device includes:

rotor fins coupled to the absorber rotor that extend outwardly therefrom;

stator fins coupled to the outer mover that extend radially inward between the rotor fins such that one or more areas are formed between the rotor fins and the stator fins; and a fluid disposed in the areas that opposes motion rotor fins and the stator fins relative to one another.

8. The drilling system of claim 1, wherein the fluid is oil.

* * * * *